United States Patent
Wilkerson et al.

(10) Patent No.: US 7,370,589 B2
(45) Date of Patent: May 13, 2008

(54) SYSTEMS AND METHODS FOR FLUID DISPENSING

(75) Inventors: John B. Wilkerson, Knoxville, TN (US); John H. Hancock, Champaign, IL (US); Fred H. Moody, Knoxville, TN (US); Melvin A. Newman, Jackson, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 254 days.

(21) Appl. No.: 10/831,079

(22) Filed: Apr. 23, 2004

(65) Prior Publication Data

US 2004/0231575 A1 Nov. 25, 2004

Related U.S. Application Data

(60) Provisional application No. 60/465,047, filed on Apr. 24, 2003.

(51) Int. Cl.
- A01C 23/00 (2006.01)
- B05B 17/00 (2006.01)
- B67B 7/00 (2006.01)
- B67D 5/08 (2006.01)
- B67D 5/14 (2006.01)

(52) U.S. Cl. .............. 111/127; 111/900; 111/904; 239/1; 222/1; 222/14; 222/56; 222/57

(58) Field of Classification Search ............ 111/118, 111/119, 127, 129, 900, 903, 904; 239/1, 239/61–64, 67–73, 650, 99, 662–664, 146, 239/172, 722, 289; 222/1, 14, 52, 56, 57, 222/638, 639, 644, 650, 71, 129, 160, 192

See application file for complete search history.

(56) References Cited

U.S. PATENT DOCUMENTS

| | | | |
|---|---|---|---|
| 3,322,080 A | 5/1967 | Gatzke et al. | |
| 3,373,705 A | 3/1968 | Hansen et al. | |
| 3,450,074 A | 6/1969 | Gatzke et al. | |
| RE31,023 E * | 9/1982 | Hall, III | 405/37 |
| 4,448,820 A | 5/1984 | Buschor | |
| 4,561,565 A | 12/1985 | Wolf et al. | |
| 4,765,263 A | 8/1988 | Wilkins | |
| 5,024,173 A | 6/1991 | Deckler | |
| 5,379,812 A | 1/1995 | McCunn et al. | |

(Continued)

OTHER PUBLICATIONS

A New Method of Soil Application of Aldicarb by Ghidiu et al. (Prod. Agric., 8(1): 43-45 (1995)).

(Continued)

*Primary Examiner*—Christopher J. Novosad
(74) *Attorney, Agent, or Firm*—Jenkins, Wilson, Taylor & Hunt, P.A.

(57) ABSTRACT

Systems and methods are disclosed for dispensing fluids. The systems can include a sensor operable to detect when an object passes a first location as the object moves to a second location. The systems can also include a fluid dispenser operable to dispense fluid at the second location. In addition, the systems can include a control unit in communication with the sensor and the fluid dispenser. The control unit can receive information from the sensor that the object has passed the first location and to control the fluid dispenser to dispense fluid at the second location at a predetermined time after the object passes the first location.

13 Claims, 11 Drawing Sheets

U.S. PATENT DOCUMENTS

| | | |
|---|---|---|
| 5,650,609 A | 7/1997 | Mertins et al. |
| 5,744,793 A * | 4/1998 | Skell et al. ............... 250/222.1 |
| 5,847,389 A | 12/1998 | Mertins et al. |
| 5,848,571 A | 12/1998 | Stufflebeam et al. |
| 5,924,371 A | 7/1999 | Flamme et al. |
| 6,047,652 A | 4/2000 | Prairie et al. |
| 6,070,539 A | 6/2000 | Flamme et al. |
| 6,216,615 B1 | 4/2001 | Romans |
| 6,273,010 B1 | 8/2001 | Luxon |
| 6,289,829 B1 | 9/2001 | Fish et al. |
| 6,453,832 B1 | 9/2002 | Schaffert |
| 6,477,967 B2 | 11/2002 | Rosenboom |
| 6,481,647 B1 | 11/2002 | Keaton et al. |
| 6,516,733 B1 | 2/2003 | Sauder et al. |
| 6,763,773 B2 | 7/2004 | Schaffert |

OTHER PUBLICATIONS

Precision Placement of In-Furrow Insecticide for Early Season Thrips Control by Roberts et al. (Proc. Beltwide Cotton Conf., 1269-1270 (1998)).

Precision Application of Aldicarb to Enhance Efficiency of Thrips Management in Cotton by Lohmeyer et al. (J. Econ. Entomol., 96(3): 748-754 (2003)).

[Thesis] Design and Evaluation of a Seed-Specific Applicator for In-Furrow Chemical Application by Hancock (The University of Tennessee, Department of Biosystems Engineering and Environmental Science, Knoxville, Tennessee, U.S.A. (2003)).

* cited by examiner

SYSTEMS AND METHODS FOR FLUID DISPENSING

RELATED APPLICATION

This application claims the benefit of U.S. Provisional Patent Application Ser. No. 60/465,047, filed Apr. 24, 2003; the disclosure of which is incorporated herein by reference in its entirety.

TECHNICAL FIELD

The subject matter disclosed herein relates generally to agricultural equipment. More particularly, the subject matter disclosed herein relates to systems and methods for fluid dispensing.

RELATED ART

It is often necessary to apply one or more materials, such as a fluid, to discrete target objects separated in time and/or distance. These materials are typically applied to the target objects as a continuous flow. This technique is wasteful because the material is applied not only to the target objects, but also between target objects where little or no useful benefit occurs. An example of the usefulness of such an approach arises when planting seeds in a typical crop production system. Crop protectants, such as fungicides and insecticides, are commonly applied to the seed/soil interface during the planting process.

In many field and vegetable crops, crop protectants are commonly applied in-furrow with the seed at planting. Products such as bifenthrin, chlorpyrifos, fipronil, and terbufos are used in corn production for the control of various worm and insect pests. Other products, such as aldicarb, disulfoton, and quintozene, are used in cotton to control nematodes, early-season insects, and soil-borne fungi. In-furrow applications of similar products are made in carrot, onion, potato, soybean, and wheat production. Regardless of crop, these products are typically applied as a continuous stream of chemical spray or granules directly into the open furrow. These crop protectants are generally applied as a continuous band along the furrow length.

Figure 1:
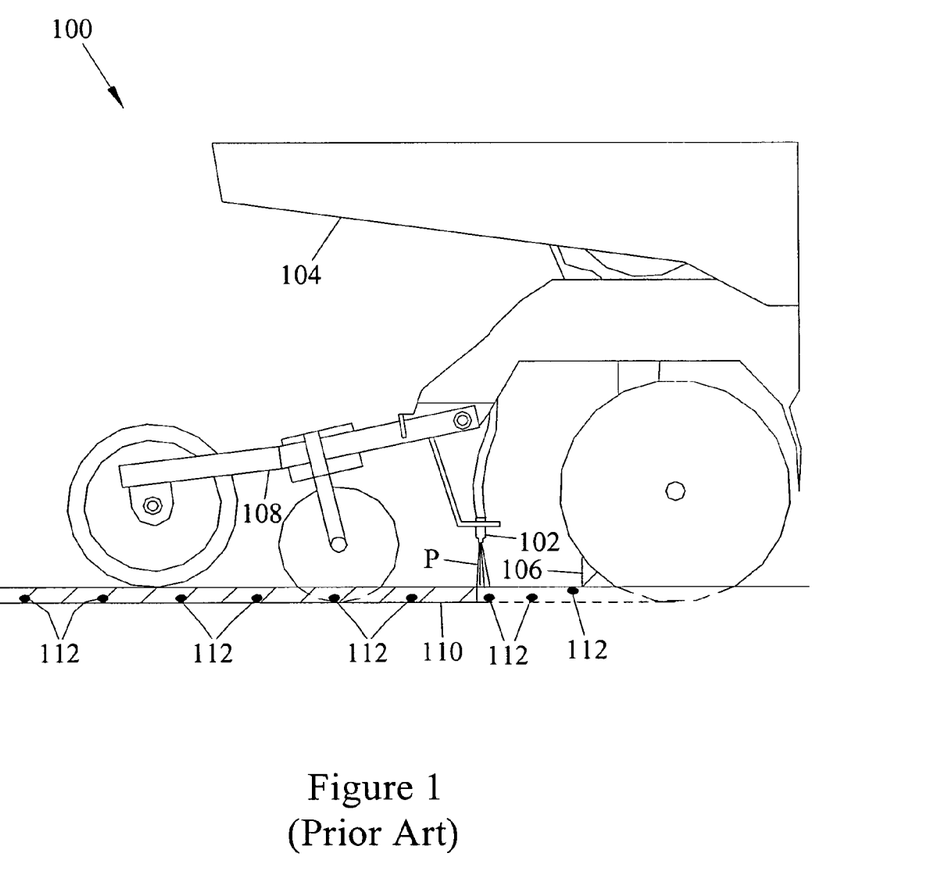
FIG. 1 is a side view of a conventional planter system.

FIG. 1 illustrates a side view of a conventional planter system, generally designated 100. System 100 includes a nozzle 102 mounted on a planter unit 104 between a seed delivery tube 106 and a furrow-closing device 108. During operation, tube 106 delivers seeds 112 to spaced apart positions along the length of furrow 110. Nozzle 102 continuously applies a protectant P to the length of a furrow 110 as seeds 112 are delivered by tube 106. The result is that protectant P is sprayed in the areas between seeds 112. Recent research suggests that some chemicals are only required in a localized zone around the seed. Therefore, minimizing or eliminating the chemical applied between seeds 112 can result in substantial material savings.

Seeds are typically placed some distance apart. For example, typical seed spacings for cotton of 6 to 10 centimeters are common in cotton, while corn seed spacings range from 15 to 20 centimeters. At these spacings, a significant amount of material is placed far from the seed. Therefore, for in-furrow applications, it is desirable to provide seed-specific placement in a localized zone around each seed such that the amount of material applied between seeds is minimized.

Research suggests that the conventional method of in-furrow chemical application is inefficient. Revised application methods are proposed in *A New Method of Soil Application of Aldicarb* by Ghidiu et al. (*Prod. Agric.*, 8(1): 43-45 (1995)) following reports that crop plants absorb less than 20% of soil-applied aldicarb. Instead of applying a continuous band of aldicarb granules, the article teaches using a hand applicator to concentrate the granular insecticide in a small area surrounding potato seedpieces. The amount of product applied was identical to the conventional method, however, active ingredient concentration within the area surrounding each seed was much higher with the revised method. Results were mixed, but in general, concentrated application was as effective as the conventional method for controlling Colorado potato beetles.

*Precision Placement of In-Furrow Insecticide for Early Season Thrips Control* by Roberts et al. (*Proc. Beltwide Cotton Conf.*, 1269-1270 (1998)) reports the evaluation of precision in-furrow placement of granular aldicarb for controlling early-season thrips (also known as *Frankliniella fusca*] in cotton. The study involved cotton planted in groups of 2 to 4 seeds, with each group spaced 23 to 38 centimeters apart, a practice known as hill-drop planting. Following planting, aldicarb granules were manually placed in each hill, eliminating insecticide typically placed between the seed groups. Precision application provided thrips control equivalent to the conventional, continuous method, but at significant cost savings. *Precision Application of Aldicarb to Enhance Efficiency of Thrips Management in Cotton* by Lohmeyer et al. (*J. Econ. Entomol.*, 96(3): 748-754 (2003)) reports similar results in a three-year study conducted at multiple locations.

The thesis entitled *Design and Evaluation of a Seed-Specific Applicator for In-Furrow Chemical Application* by Hancock (The University of Tennessee, Department of Biosystems Engineering and Environmental Science, Knoxville, Tenn., U.S.A. (2003)) reports tests of seed-specific placement of in-furrow spray fungicides for seeding disease control in cotton. Earlier research shows that fungicides protected seeds and seedlings by providing a "zone of protection" in which pathogenic activity was inhibited. However, the earlier research did not specifically address the contribution fungicide applied between seeds makes toward protecting seedlings. In the tests conducted by Hancock, cotton seeds were planted at a spacing of 10.2 centimeters, and seed-specific treatements (quintozene+etridiazole) were applied as spray bands 5.1 centimeters in length, such that material savings of 50% were realized. Plots were inoculated with seedling disease pathogens (such as *Rhizoctonia solani* and *Pythium* spp.), and the untreated control produced only 0.5 plants per meter. Seed-specific fungicide application increased plant stands to 4.2 plants per meter. Differences between seed-specific and conventional treatments were not significant.

Because of the obvious benefits, it is therefore desirable to develop systems and methods for fluid dispensing which provide seed-specific application systems and methods for in-furrow application chemicals for improving in-furrow chemical application efficiency and decreasing variable costs for agricultural producers.

SUMMARY

Systems and methods are provided for dispensing fluids. According to one embodiment, a fluid dispensing system is provided including a sensor operable to detect when an object passes a first location as the object moves to a second location. The system can also include a fluid dispenser operable to dispense fluid at the second location. In addition, the system can include a control unit in communication with the sensor and the fluid dispenser. The control unit can receive information from the sensor that the object has passed the first location and to control the fluid dispenser to dispense fluid at the second location at a predetermined time after the object passes the first location. According to one embodiment, a method can include a step for receiving information from the sensor that the object has passed the first location. The method can also include a step for controlling the fluid dispenser to dispense fluid at the second location at a predetermined time after the object passes the first location in response to receiving information from the sensor that the object has passed the first location.

An object having been stated hereinabove, and which is achieved in whole or in part by the present subject matter, other objects will become evident as the description proceeds when taken in connection with the accompanying drawings as best described hereinbelow.

BRIEF DESCRIPTION OF DRAWINGS

Exemplary embodiments of the subject matter will now be explained with reference to the accompanying drawings, of which.

DETAILED DESCRIPTION

Systems and methods are provided herein for fluid dispensing. In particular, the systems and methods provided herein can be applied to agricultural equipment for seed-specific application of fluids, such as pesticides, fertilizers, and inoculums dispensed during planting. The systems and methods provided herein can dispense agricultural fluids in conjunction with any seed metering device. In addition, the systems and methods can dispense a consistent amount of fluid adequate for each seed without unnecessary waste or over application. The fluid can be dispensed after the seeds are metered so as to coordinate the deposit of an amount of fluid with the deposit of a seed.

Although the systems and methods are described with respect to agricultural equipment, it is envisioned that these systems and methods can also be applied to other suitable industrial equipment and processes for target-specific application of fluid to objects that cannot be synchronized in time or distance. The systems and methods described herein can minimize the fluid wasted between target objects by sensing a target object some time or distance prior to application, tracking the projected time of application, and delivering the fluid directly to the target object. Further, the systems and methods described herein can track multiple target objects between a detection point and an application point.

Figure 2:
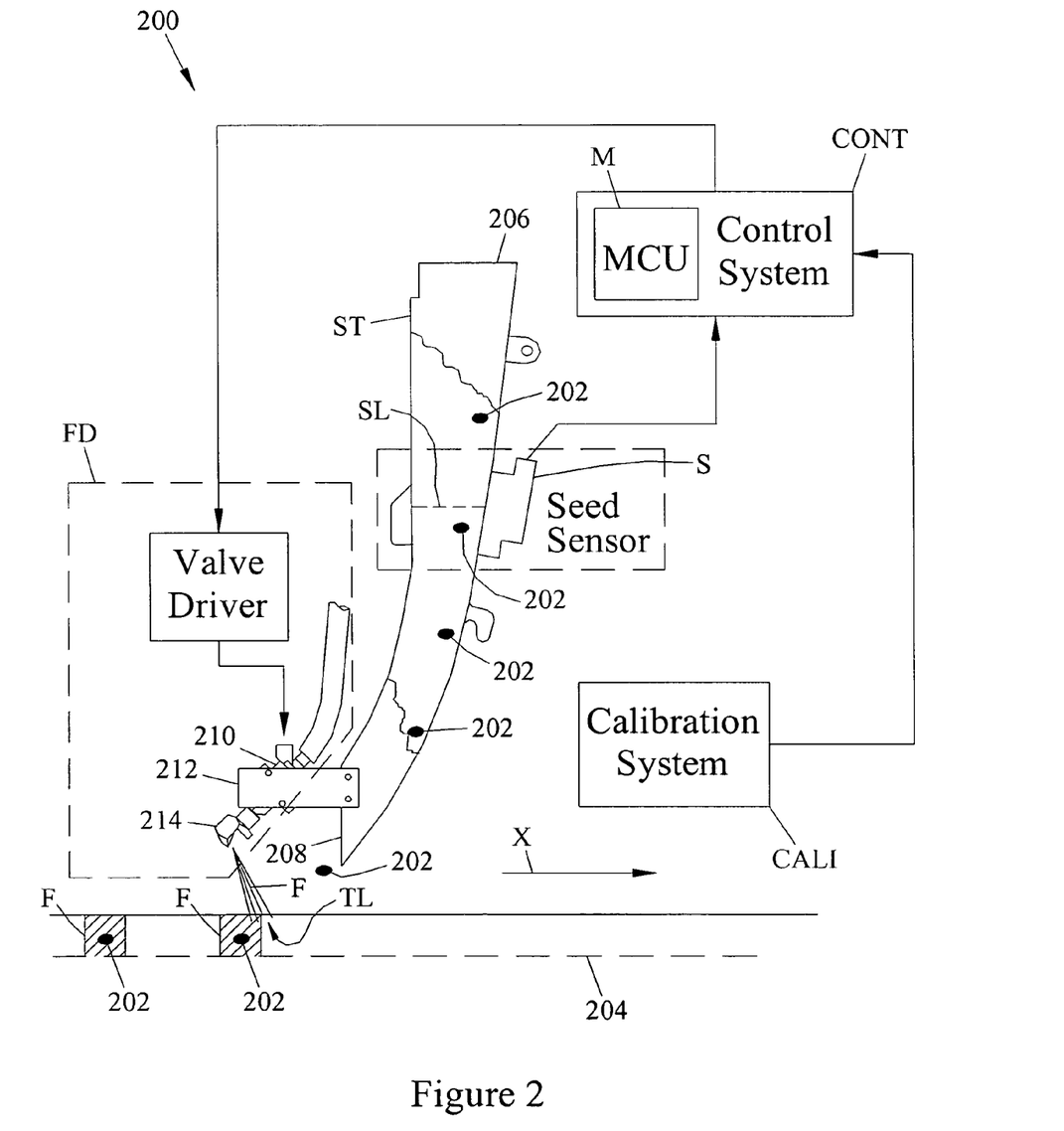
FIG. 2 is a schematic diagram illustrating an exemplary fluid dispensing system shown during an operation of planting a plurality of seeds and dispensing fluid.

FIG. 2 is a schematic diagram illustrating an exemplary fluid dispensing system, generally designated 200, shown during an operation of planting a plurality of seeds 202 and dispensing fluid F. System 200 can be attached to mobile farm equipment. System 200 can position and space one or more seeds 202 at predetermined distances apart along the length of a furrow 204 as the farm equipment moves in the direction of direction arrow x. System 200 can also dispense a discrete volume of fluid F onto and/or near each seed 202 positioned in furrow 204.

Fluid F and seed 202 can comprise a variety of types of fluids and seeds typically used in the agricultural industry. For example, fluid F can comprise water or a chemical formulation such as an insecticide, pesticide, or fertilizer. Alternatively, rather than a fluid, discrete volumes of granular or powder objects can be dispensed by system 200 and applied to seeds 202. Seed 202 can comprise corn, cotton seed, or other suitable seeds.

As stated above, system 200 can position one or more seeds 202 in furrow 204 at predetermined distances apart. System 200 can include a seed hopper (not shown) for holding a plurality of seeds 202 for planting. A meter (not shown) can retrieve seeds 202 from the seed hopper and release seeds 202 at predetermined intervals into a top portion 206 of a seed tube ST. The dropped seeds 202 can be transmitted by gravity through seed tube ST to an open bottom end 208 where seeds 202 are directed into furrow 204. System 200 can be attached to the mobile farm equipment and moved in the direction indicated by direction arrow x such that seeds 202 are deposited at different positions along the length of furrow 204. The spacing of seeds 202 in furrow 204 can be controlled by changing the rate that seeds 202 are released into seed tube ST and the speed that open bottom end 208 moves in the direction of direction arrow x.

As stated above, system 200 can dispense a discrete volume of fluid F onto or near each seed 202. System 200 can time the release of fluid F from fluid dispenser FD such that fluid F is released on and/or near each seed 202 in furrow 204. Fluid dispenser FD is shown in FIG. 2 spraying fluid F onto furrow 204 just after application of fluid F to seeds 202 in furrow 204. System 200 can comprise a seed sensor S, a fluid dispenser (generally designated FD), and a control system (or control unit) CONT for dispensing fluid F on and/or near each seed 202. Seed sensor S can be positioned between the seed meter (not shown) and furrow 204 for detecting each time one or more seeds 202 pass a sensed location SL in seed tube ST. Seed sensor S can also be in communication with control system CONT for indicating to control system CONT that one or more seeds 202 are detected. According to one embodiment, seed sensor S can produce an electrical pulse each time one or more seeds 202 pass sensed location SL. In addition, seed sensor S can monitor seeding rates (seeds/area) during planting and provide status to an operator with status information such as the presence of a plugged tube or empty seed hopper.

Control system CONT can receive an indication from seed sensor S each time one or more seeds 202 pass sensed location SL. In addition, control system CONT can communicate with fluid dispenser FD for providing control signals to dispense fluid F on and/or near each seed 202 placed in furrow 204. Control system CONT can control fluid dispenser FD to dispense fluid F a predetermined time after receiving indication from seed sensor S that one or more seeds 202 have passed sensed location SL. The predetermined time can be set such that fluid dispenser FD deposits fluid F on and/or near each seed S as it reaches a target location, generally designated TL.

The predetermined time can be selected as the time calculated for seed 202 to move from sensed location SL to target location TL where fluid dispenser FD dispenses fluid F. Thus, when control system CONT receives an indication that seed 202 passes sensed location SL, control system CONT can control fluid dispenser FD to dispense fluid F at target location TL after the predetermined time. During operation, seed 202 can arrive at target location TL at the predetermined time after passing sensed location SL and receive fluid F. The result is that fluid F is deposited directly on one or more seeds 202 positioned in furrow 204. Alternatively, the predetermined time can be selected to be greater than or less than the time for seed 202 to move from sensed location SL to target location TL such that fluid dispenser FD releases fluid F at a desired location near seed 202.

Seed detection by seed sensor S can ensure that system performance is not solely dependent on the ability of the meter and seed tube ST to deliver seeds 202 at uniform intervals to a location for receiving fluid F from fluid dispenser FD. Seed detection ensures that the dispensing of fluid F corresponds with the actual dropping of each seed 202, rather than the expected dropping of each seed 202.

Seed sensor S can be an object sensor with Part Number AA41595 available from Deere & Company of Moline, Ill., U.S.A., consisting of paired emitter and detector arrays. The arrays can be mounted opposite each other on seed tube ST. Further, seed sensor S can comprise any other suitable object sensor known to those of skill in the art.

Control system CONT can comprise a programmable microcontroller unit (MCU) M having an interface with seed sensor S for receiving an indication of seed detection or seed event. MCU M can implement a process for calculating the predetermined time for seed arrival at target location TL. The predetermined time (or seed arrival time) can be determined based on an average time for seed 202 to move from sensed location SL and the target location TL. The average seed travel time can be calculated by a calibration system CALI (or calibration unit). At each predicted arrival time, MCU M of control system CONT can output an actuation signal to fluid dispenser FD for controlling fluid dispenser FD to dispense fluid F. The pulse-width of the actuation signal can correspond with the time required to produce a desired spray band length along furrow 204 for a given field speed.

MCU M can track one or more seeds in transit at any time between sensed location SL and target location TL. MCU M can include one or more timers each associated with one or more seeds 202 operable to track time for seeds 202 in transit between sensed location SL and target location TL. Multiple timers can be utilized when more than one seed is in transit at any time between sensed location SL and target location TL. This can occur when the time between the dispensing of seeds 202 is less than the seed travel time between the sensed location in seed tube ST and the liquid application location. For example, in the embodiment shown in FIG. 2, the average travel time for corn and cotton seeds between sensed location SL in seed tube ST and the fluid application location can range between about 99 and 127 milliseconds. At a representative seeding rate of 160,000 seeds per hectare planted at 9.7 kilometers per hour on 102 centimeter rows, seed tube ST can deliver 44 seeds per second, resulting in a minimum of four seeds in transit between sensed location SL and the fluid application location at target location TL.

Referring to FIG. 2, MCU M can simultaneously process multiple seed arrival times. According to one embodiment, MCU M can be a microcontroller unit with Part Number MC68HC11E9 available from Motorola, Inc. of Schaumburg, Ill., U.S.A. MCU M can include a free-running, 16-bit counter (TCNT). The counter can be driven by a programmable prescalar of the system clock. Input capture (IC) functions can allow time stamping of seed events. When a predefined edge transition occurs on a selected pin of the MCU, the TCNT value can be latched and an interrupt generated. Output compare (OC) functions can allow precise timing of actions via writable Timer Output Compare (TOC) registers. MCU M can generate an interrupt when TCNT equals the value stored in a TOC register.

The output of seed sensor S can be connected to an IC channel of MCU M. Two OC channels of MCU M can control the ON/OFF timing of the high-speed valve. Each time one of seeds 202 is detected, the TCNT value can be latched to a register of MCU M. A delay, corresponding to average travel time (predetermined time), can be added to the latched value. The result, representing predicted seed-arrival time at furrow 204, can be stored in a memory. Stored seed arrival times can be processed in the interrupt routine of the OC channel that controlled ON timing of fluid dispenser FD. Stored values can be consecutively loaded into a TOC register (such as TOC1) such that an interrupt is generated at each predicted seed arrival time. The interrupt routine can implement the following processes: (1) fluid dispenser FD is actuated; (2) the turn off time for fluid dispenser FD can be calculated and this value loaded into the TOC register (such as TOC2) that controlled turn off timing; and (3) the next stored value of seed arrival time is loaded into the TOC1 register. When TCNT equals the value stored in TOC2, a second interrupt can be generated, and fluid dispenser FD turned off.

As stated above, fluid dispenser FD can dispense fluid F on or at a desired location near seed 202 in response to actuation signals from control system CONT. According to one embodiment, fluid dispenser FD can comprise a high-speed electromechanical valve 210, a valve driver circuit 212, and a nozzle 214. Fluid dispenser FD can also comprise a fuel injector for serving as a high-speed fluid valve. An exemplary fuel injector is the fuel injector with Part Number P82X-765 available from RC Engineering, Inc. of Saginaw, Mich., U.S.A. An exemplary nozzle is a low-pressure nozzle that produces a 50-degree flat-fan pattern such as the nozzle with Part Number 5005 available from Spraying Systems Co. Actuator and nozzle 214 can be rigidly mounted at outlet end 208.

Valve driver circuit 212 can electrically isolate control system CONT from valve 210, control current through valve 210, and minimize valve response time. Driver components for circuit 212 can include an optoisolator, a power transistor, and a peak-and-hold integrated circuit.

Figure 3:
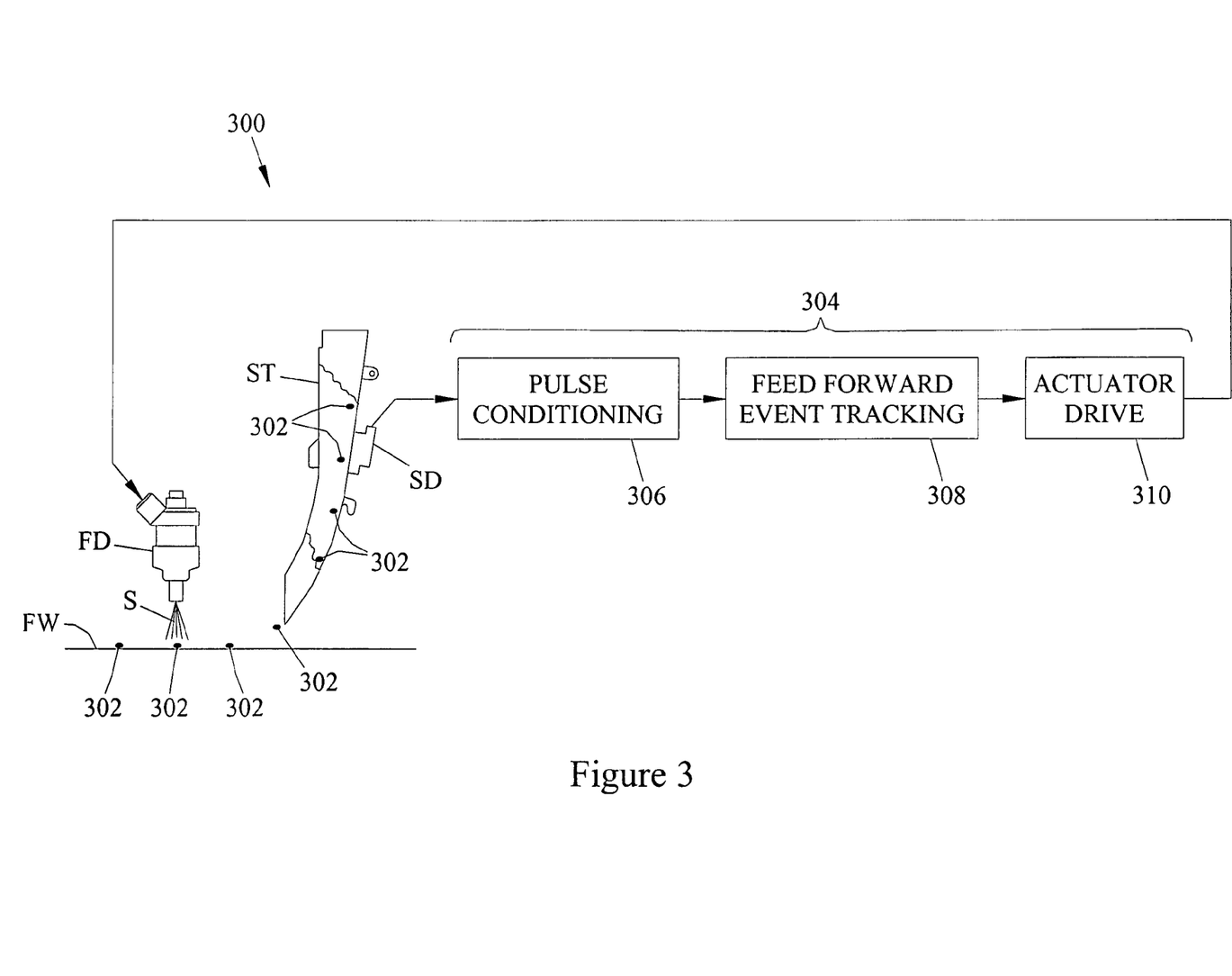
FIG. 3 is a schematic diagram illustrating another exemplary fluid dispensing system according to another embodiment.

FIG. 3 is a schematic diagram illustrating another exemplary fluid dispensing system, generally designated 300, according to another embodiment. System 300 can comprise an optical seed detector SD for detecting seeds 302 as they pass through a seed tube ST and emitting an electrical pulse as each 302 seed passes. After passing through seed tube ST and reaching a furrow FW, seeds 302 can be covered with a pulse of spray S (or fluid) by fluid dispenser FD for forming a protective zone around each seed 302.

Referring to FIG. 3, system 300 can comprise a discrete event tracking system, generally designated 304, in communication with seed detector SD and operable to receive the pulse signal emitted from seed detector SD as each seed 302 is detected. Event tracking system 304 can wait a predetermined time after receiving the pulse signal and then actuate fluid dispenser FD to spray seed 302. Event tracking system 304 can comprise a pulse conditioning unit 306, a feed-forward event tracking unit 308, and an actuator drive 310.

Event tracking unit 308 can be implemented with either a sequential digital hardware or a programmable microcontroller. Event tracking unit 308 can comprise a shift register for tracking multiple seeds 302 at the same time. This is beneficial when more than one seed 302 is between seed detector SD and fluid dispenser FD at any time. For example, according to one embodiment, approximately 106 milliseconds are required for a cotton seed to travel from seed detector SD to the outlet of seed tube ST. At a seed drop rate of 53 seeds per second, a seed passes seed detector SD every 19 milliseconds. Therefore, in this example, at any time, there can be up to 5 seeds between seed detector SD and the outlet of seed tube ST.

Event tracking unit 308 can comprise a shift register for tracking multiple seeds 302 at the same time. This is beneficial when more than one seed 302 is between seed detector SD and fluid dispenser FD at any time. According to one embodiment, the time difference between when a seed is detected and sprayed is divided into n increments of equal time, n being the number of bits in the shift register. The shift register can include n bits for tracking the projected time of spray application based on the time required for a seed to travel from seed detector SD to the point of fluid application by fluid dispenser FD. Each bit in the shift register can represent an increment of time between when a seed is sensed and when a control action is performed. A variable clock frequency allows system delay time adjustment by a calibration system, such that the total number of clock cycles (n-bits) equals the desired delay time for each seed. For example, if the mean delay time for a given seed type is 100 milliseconds and a 48-bit shift register is used, the clock period is set to 2.1 milliseconds (100 milliseconds per 48 bit shift register).

Referring to FIG. 3, an electrical pulse can be generated each time seed 302 passes seed detector SD. Pulse conditioning unit 306 can condition the electrical pulse to make the signal compatible with the signal register. The conditioned electrical pulse can be presented to the input bit of the shift register and shifted through to the output bit. At the output bit, the pulse is received by actuator drive 310 which can be operable to turn an electromechanical actuator of fluid dispenser FD on and off.

Figure 4A:
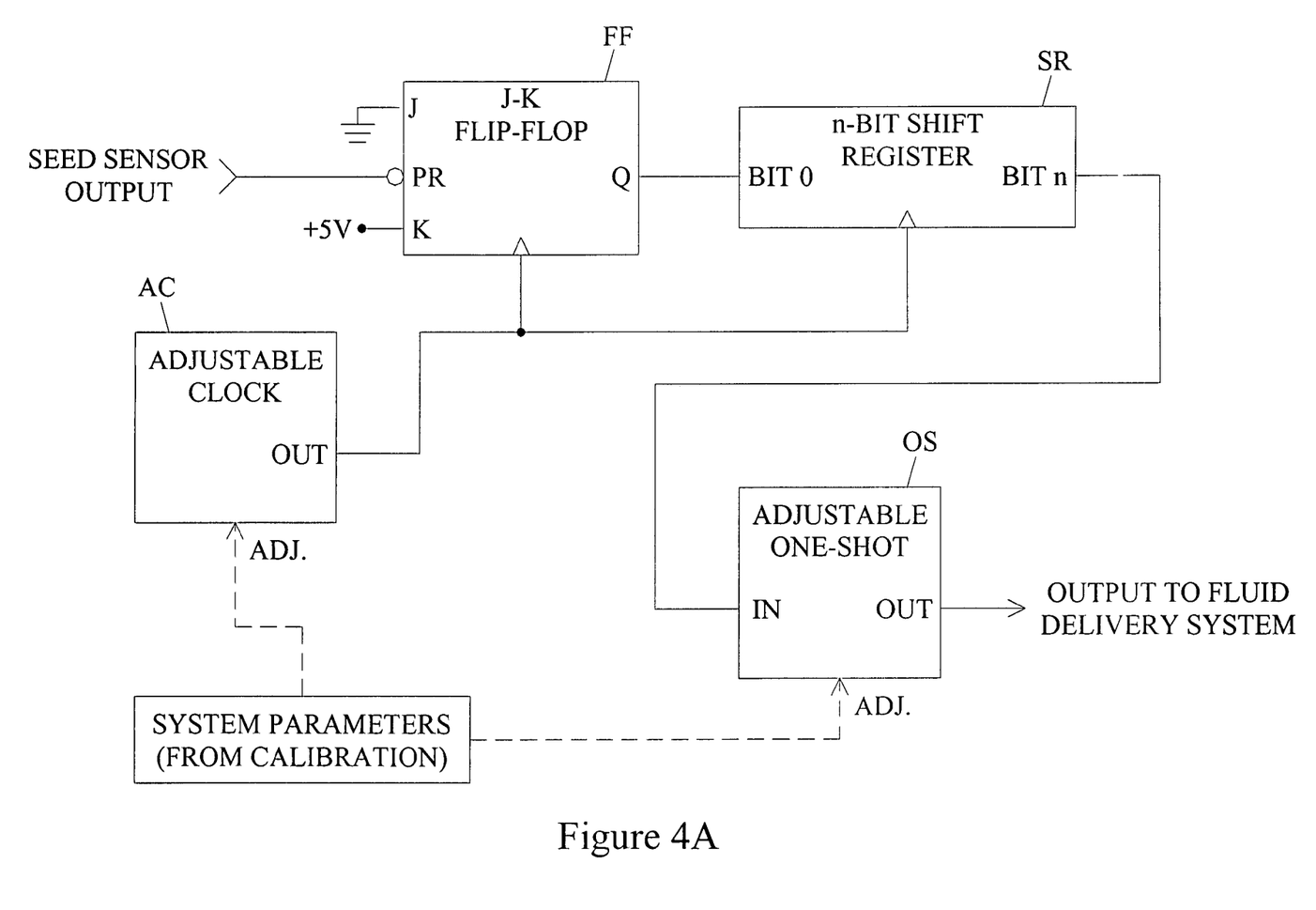
FIG. 4A is a schematic diagram of a control system according to one embodiment.
Figure 4B:
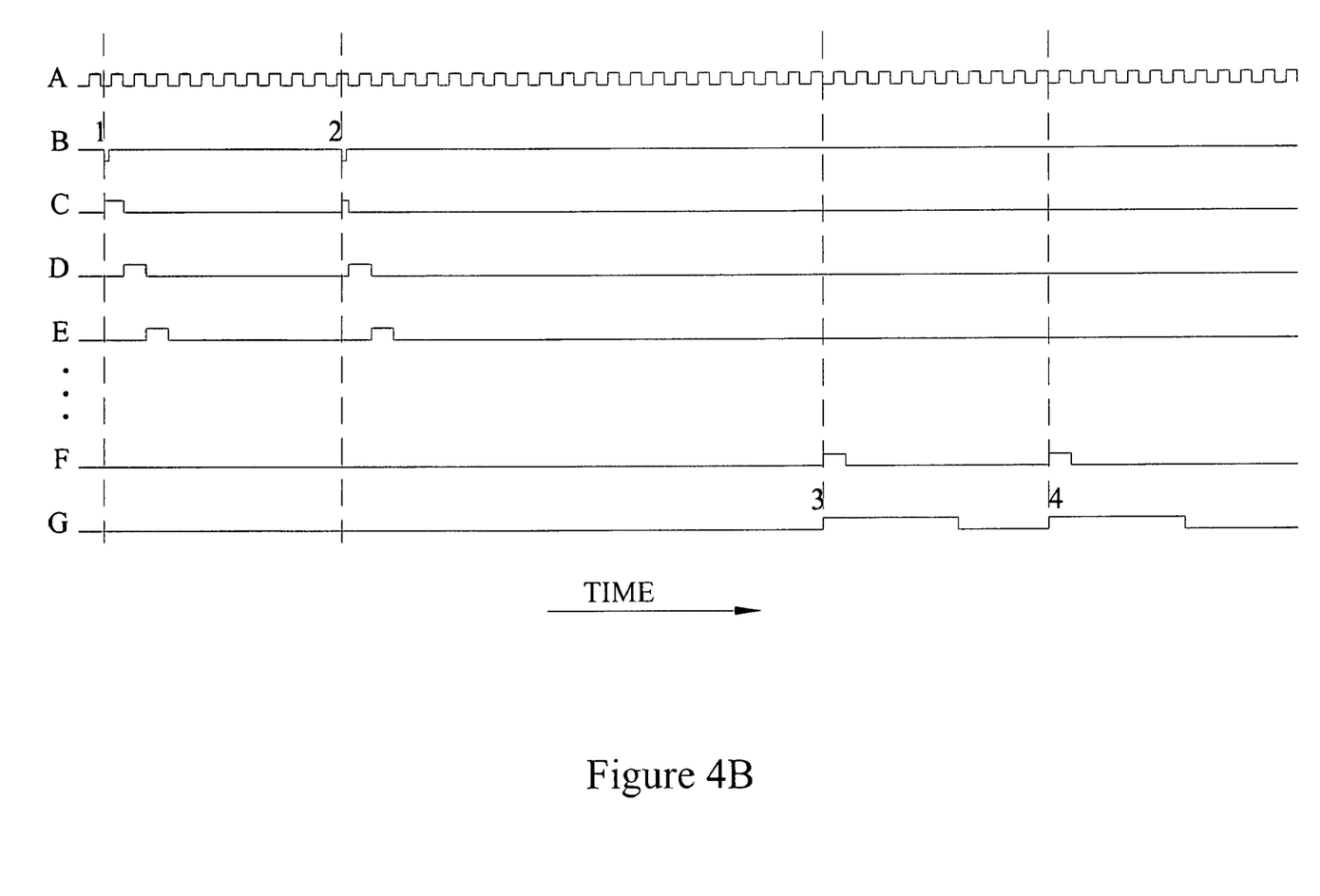
FIG. 4B is an exemplary timing diagram corresponding to the control system shown in FIG. 4A.

FIGS. 4A and 4B are a schematic diagram of a control system (generally designated 400) and a related exemplary timing diagram, respectively, according to one embodiment. Referring to FIG. 4A, control system 400 can include digital hardware comprising an adjustable clock AC, a J-K flip-flop FF, an n-bit shift register SR, and an adjustable one-shot OS.

System 400 can control fluid pulse delivery. Adjustable clock AC can comprise a SA555P Precision Timer available from Texas Instruments Incorporated of Dallas, Tex., U.S.A. J-K flip-flop FF can comprise a SN74LS112AN J-K flip-flop available from Texas Instruments Incorporated. Shift register SR can comprise one or more 74F676SPC 15-bit shift registers available from Fairchild Semiconductor Corporation of South Portland, Me., U.S.A. Adjustable one-shot OS can comprise an SN74123N Retriggerable monostable multivibrator available from Text Instruments Incorporated.

Referring to FIG. 4B, the exemplary timing diagram illustrates the outputs of several components of system 400 (FIG. 4A). Reference A designates the output of clock AC. Reference B designates the output of a seed detector (such as seed detector 214) received by flip-flop FF. Reference C designates the output of flip-flop FF. References D, E, and F designate the states of shift register bits 0, 1, and n, respectively, of shift register SR, wherein bit n is the last bit in the sequence of bits in shift register SR. Reference G designates the output of one-shot OS.

Referring simultaneously to FIGS. 4A and 4B, timing diagram can include a first event 1 that can occur when control system 400 detects a first seed. The output state of flip-flop FF can immediately transition to High and remain so until a clock falling edge is generated by adjustable clock AC. When a clock falling edge occurs and flip-flop FF is in a High state, bit 0 of shift register SR can be at a High state. On the next clock falling edge, the High bit can shift from bit 0 to bit 1. This sequential shifting process can continue.

At the time indicated by a second event 2, a second seed can be detected by the seed detector and the output state of flip-flop FF transitions to state High. On the next clock falling edge, shift register bit 0 can enter a High state and, subsequently, the second High bit shifts through the bits of shift register SR on each clock falling edge. When the first High bit in shift register SR corresponding to the first seed, is shifted into bit n (shown at a third event 3 in FIG. 4B), the output of one-shot OS can enter a High state which persists long enough to apply a predetermined amount of fluid on and/or near the first seed. The output of one-shot OS can be interfaced with a fluid dispenser (such fluid dispenser 214 shown in FIG. 2) for actuating a high-speed valve on and off. At an event 4 in FIG. 4B, the output of one-shot OS can enter a High state when the second High bit corresponding to the second seed is shifted into bit n.

Referring to FIG. 4A, the length of time elapsing between the detection of a seed and fluid spray can depend on the number of bits in shift register SR and the output frequency of clock AC. According to one embodiment, the number of bits in shift register SR is fixed. In addition, the output of clock AC can be varied. The variable clock frequency can be adjusted depending on parameters determined through calibration as further described hereinbelow. Further, the length of time for the one-shot output pulse can be adjustable for altering the duration of fluid spray application. The length of time for the one-shot output pulse can be determined through calibration.

Figure 5:
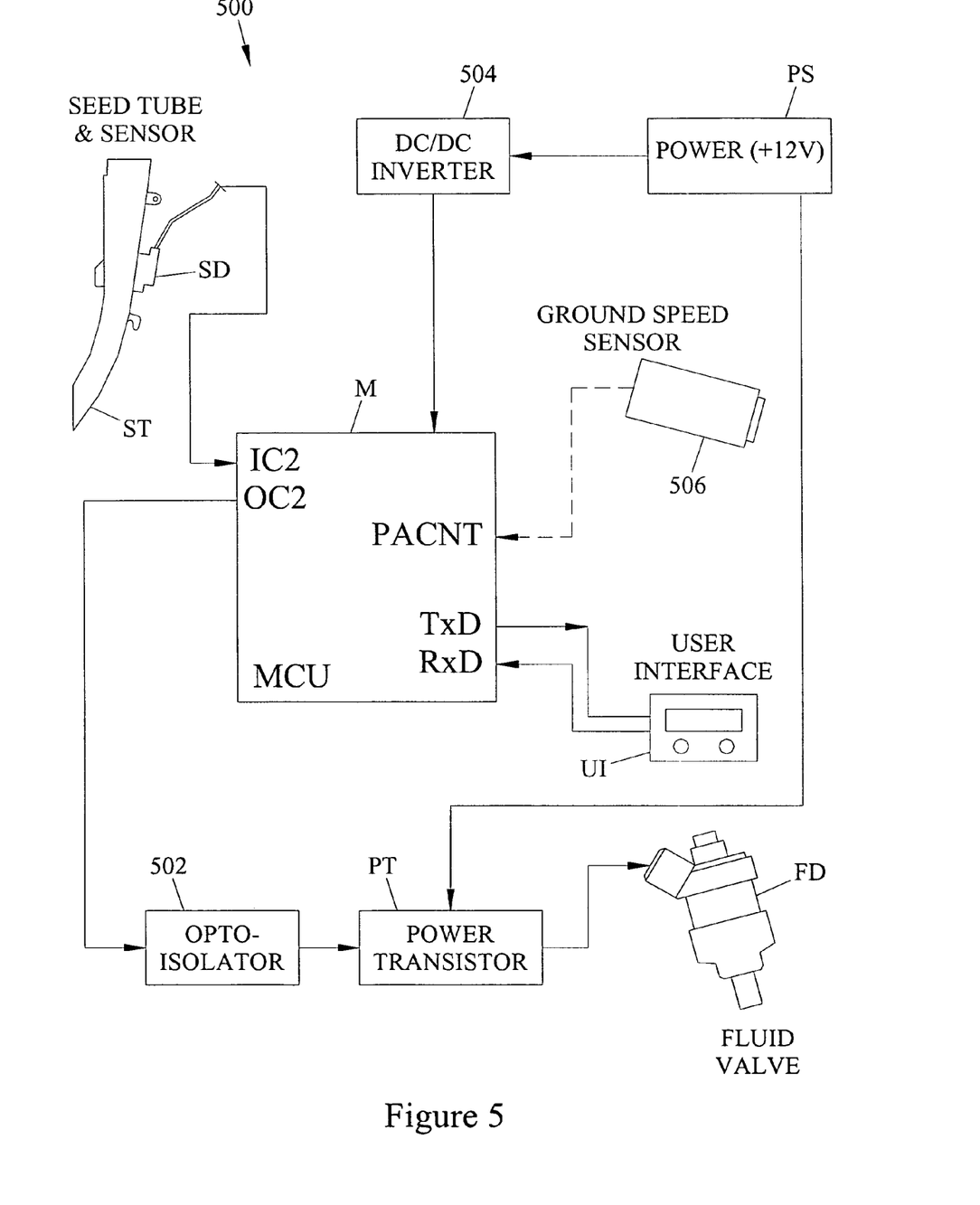
FIG. 5 is a schematic diagram of another fluid dispensing system according to the present disclosure.

FIG. 5 illustrates a schematic diagram of another fluid dispensing system, generally designated 500. System 500 can comprise a microcontroller unit (MCU) M for receiving a signal from a seed detector SD mounted on a seed tube ST that a seed has passed. MCU M can track each seed detected between seed detector SD and the point (or location) of application of fluid by a fluid dispenser. Seed detector SD can be connected to an input capture pin (IC2) of MCU M.

System 500 can comprise an optoisolator 502 for providing electrical isolation between the input signal from MCU M and the higher currents and voltages associated with DC actuators. A power transistor PT can provide current for actuating fluid dispenser FD. Power transistor PT can be connected to a 12 Volt power supply PS for powering fluid dispenser FD. System 500 can also comprise a DC/DC inverter 504 connected between power supply PS and MCU M for reducing the power supplied to MCU M. MCU M can communicate with a ground speed sensor 506 indicating the ground speed of system 500. In addition, system 500 can include a user interface UI for communicating with an operator.

Figure 6:
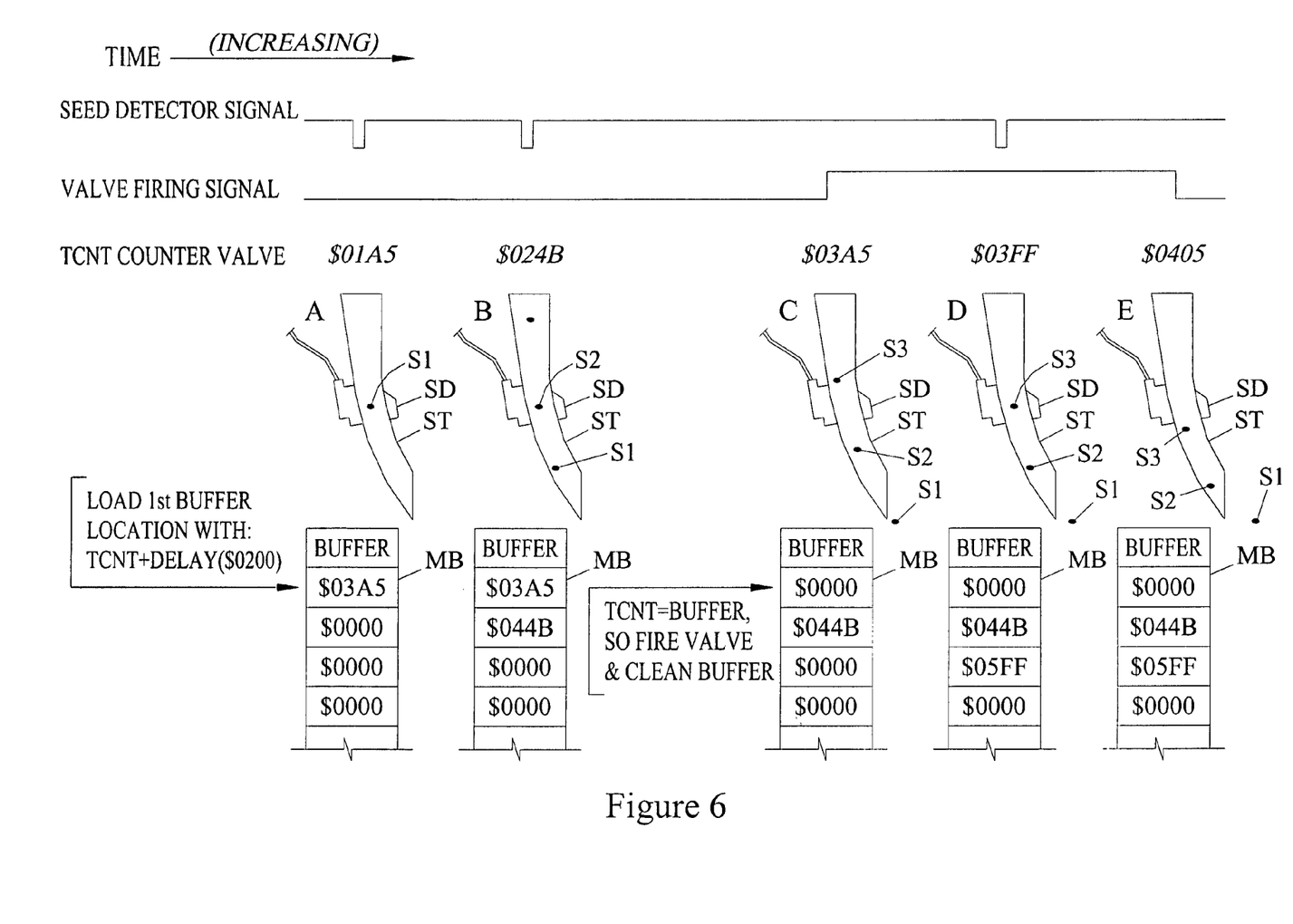
FIG. 6 is a number of schematic diagrams showing the seed tube and seed detector shown in FIG. 5 and a memory buffer of a microcontroller unit shown in FIG. 5 at different points over a period of time.
Figure 7:
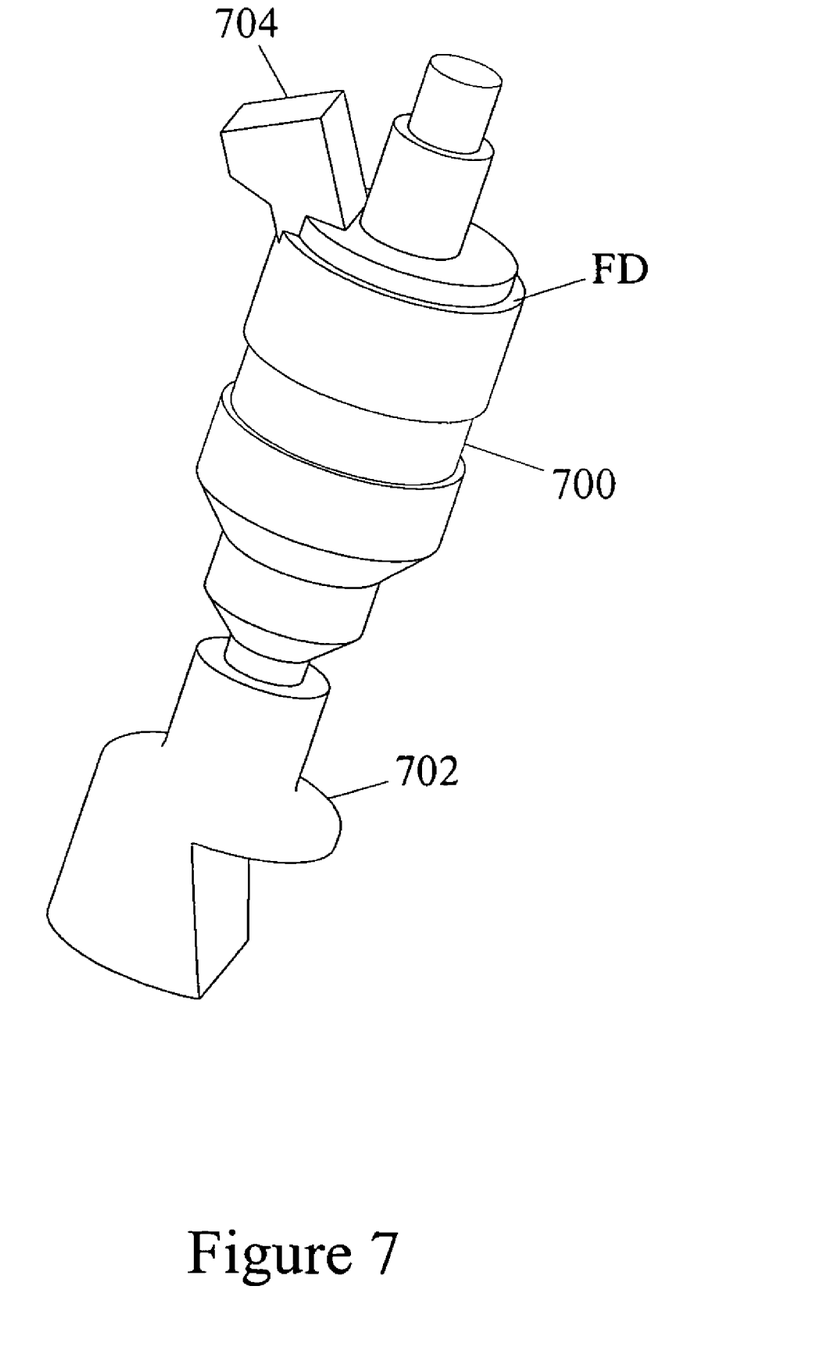
FIG. 7 is a perspective view of the fluid dispenser shown in FIG. 2.
Figure 8:
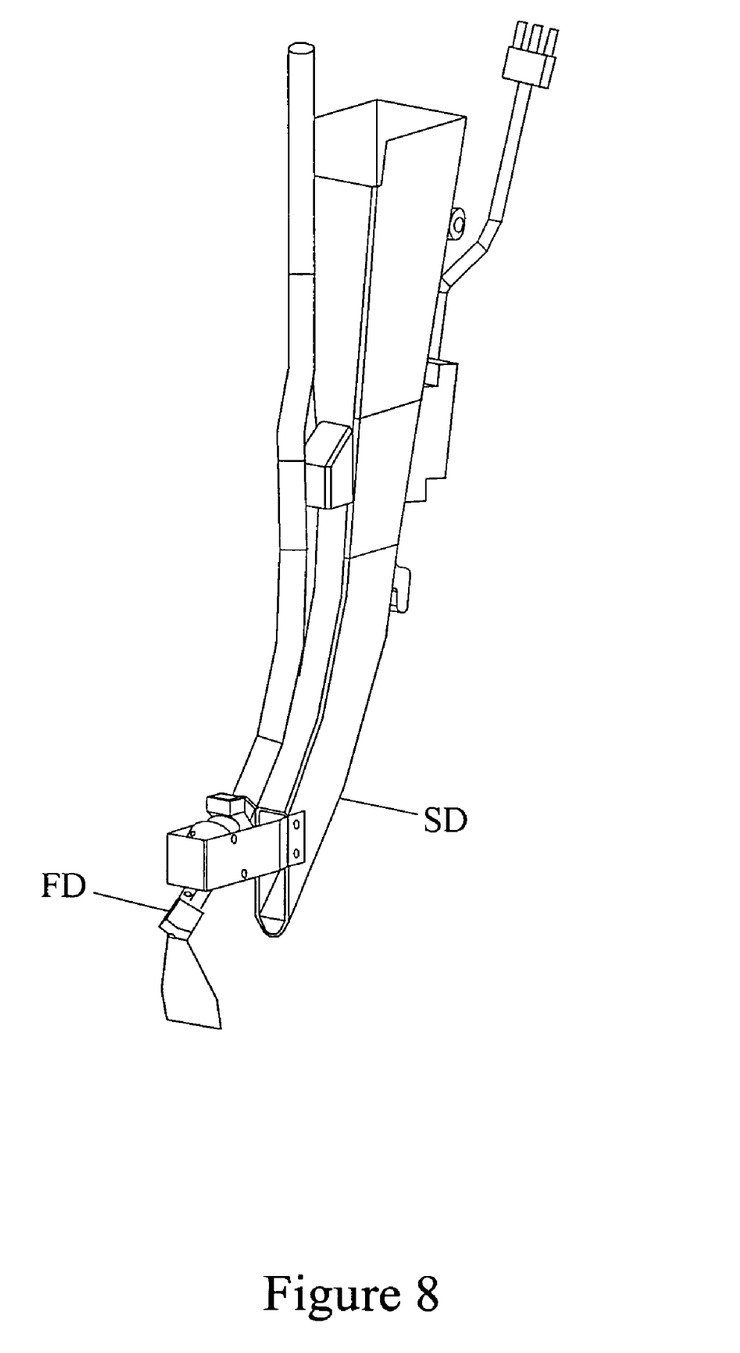
FIG. 8 is a perspective view of an assembly of a fluid dispenser, a seed tube, and a seed detector.

FIG. 6 illustrates a number of schematic diagrams (designated A-E) showing seed tube ST (FIG. 5) and seed detector SD (FIG. 5) and a memory buffer MB of MCU M (FIG. 5) at different points over a period of time. Time progresses in the direction of time direction arrow T with respect to the schematic diagrams. Thus, schematic diagram A represents the earliest time from among the diagrams, and schematic diagram E represents the latest time shown from among the diagrams. In addition, FIG. 6 illustrates timing diagrams for a Seed Detector Signal and a Valve Firing Signal corresponding to schematic diagrams A-E. Seed S1, S2, and S3 are shown passing through seed tube ST.

Referring to schematic diagram A of FIG. 6, seed S1 is passing seed detector SD. Referring again to FIG. 5, the current value of a free-running timer/counter (TCNT) Counter Value (represented by $01A5 at the time corresponding to schematic A in FIG. 6) can be latched to the input capture register and an interrupt request can be generated. A delay (represented by $0200) representing a predetermined amount of time required for a seed to fall from seed detector SD to the point of application of fluid by the fluid dispenser can be added to the latched TCNT value ($01A5) and stored in memory buffer MB (FIG. 6). The stored number can be the value that the TCNT reaches as seed SI reaches the fluid application point.

Referring to schematic diagram B of FIG. 6, a second seed S2 is shown passing seed detector SD. A value of "$044B" can be stored to the next buffer location in memory buffer MB. This value is equal to the sum of the predetermined delay ($200) and current value of the TCNT ($024B). Thus, MCU 502 is tracking seeds S1 and S2 at the time corresponding to schematic diagram B. The number of seeds MCU 702 can track at any one time is equal to the size of the memory buffer where the "TCNT+delay" values are stored.

Referring to FIG. 6, MCU 502 (FIG. 5) can implement a routine that reads each buffer value in memory buffer MB and tests whether the buffer value is equal to the TCNT counter value. When the values are equal, the following sequence can be implemented: (1) open a spray valve of the fluid dispenser FD (FIG. 5); (2) read the current TCNT counter value and add the desired pulse width (i.e., time the actuator/valve is on); and (3) store this value to a Timer Output Compare (TOCx) register. In addition, referring to schematic C of FIG. 6, the buffer can be cleared (set to "$0000") when the values are equal. An example pulse width value is "$60". The output compare function can perform a desired action or request an interrupt when TCNT=TOCx and close the spray valve. In this way, MCU 502 can track individual seeds in seed tube ST and actuate the valve at the required times.

Referring to schematic diagram C of FIG. 6, seed S1 is shown reaching the fluid application point at TCNT counter value $03A5. At this point a valve can open to begin applying spray to seed S1. The valve can close at TCNT counter value $0405 (shown in schematic E) for ceasing application to seed S1.

Figure 9:
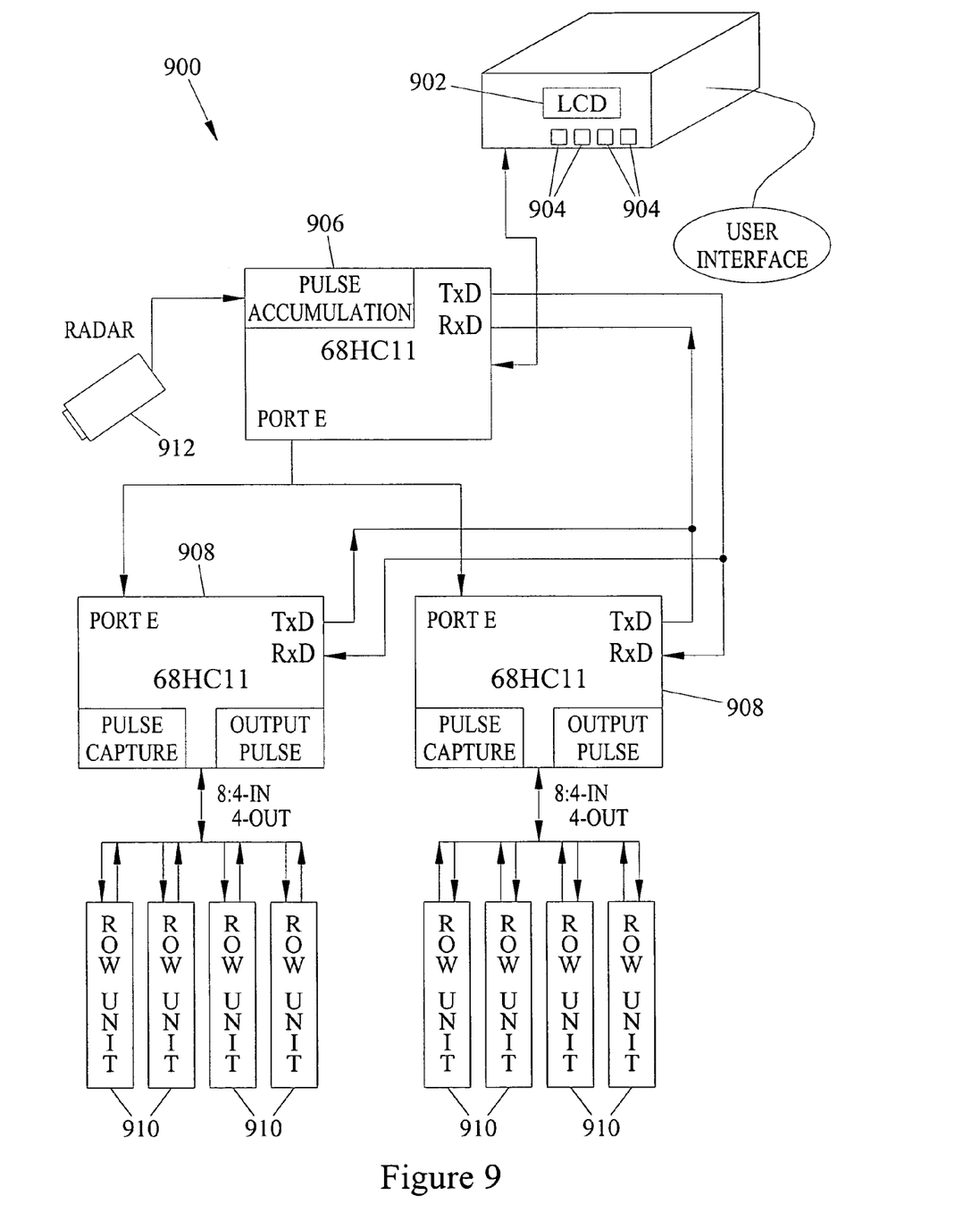
FIG. 9 is a schematic diagram illustrating an exemplary fluid dispensing system applied to a multi-row planter.

Referring again to FIG. 3, actuator drive 310 can receive be in communication with event tracking system 308 for receiving a digital signal for actuating fluid dispenser FD. Actuator drive 310 can comprise an optoisolator providing electrical isolation between the input signal and the higher currents and voltages associated with DC actuators. A power transistor can provide current for actuating fluid dispenser FD. A peak-and-hold integrated circuit (IC) (such as the IC with Part Number LM1949 available from National Semiconductor Corporation of Santa Clara, Calif., U.S.A.) can be utilized for minimizing power consumption and improving cycle times for selected electromechanical actuators.

System 500 can comprise a fluid dispenser FD for receiving signals to dispense fluids on seeds. FIG. 7 illustrates a perspective view of fluid dispenser FD shown in FIG. 5. Fluid dispenser FD can comprise a high-speed solenoid 700 integrated with a nozzle body 702. Nozzle body 702 can be selected to operate at desired cycle frequencies, flow rates, and spray patterns. Fluid dispenser FD can also comprise a fuel injector for serving as a high-speed fluid valve. An exemplary fuel injector is the fuel injector with Part Number P82X-765 available from RC Engineering, Inc. of Saginaw, Mich., U.S.A. An exemplary nozzle is a low-pressure nozzle that produces a 50-degree flat-fan pattern such as the nozzle with Part Number 5005 available from Spraying Systems Co. Such a nozzle can be attached directly to the output of the actuator. The valve can be activated by energizing a valve coil 704 with 12 Volt DC.

FIG. 8 illustrates a perspective view of an assembly of a fluid dispenser FD, a seed tube ST, and a seed detector SD. Fluid dispenser FD can dispense fluid F and be mounted to seed tube ST. Seed detector SD can be mounted to seed tube ST in position for detecting seeds passing through seed tube ST.

The fluid systems and methods described herein can also be applied to multi-row planters. FIG. 9 is a schematic diagram illustrating an exemplary fluid dispensing system, generally designated 900, applied to a multi-row planter. System 900 can comprise a user interface UI having an LCD 902 and selection buttons 904 for allowing an operator to enter calibration information into a master controller 906. User interface UI can also display real-time information on system operation. Master controller 906 can retrieve set-up information entered by an operator in user interface UI. The calibration information can be transmitted to each row controller 908 via a serial communication link. The calibration information can be transmitted when system 900 is powered on.

Master controller 906 can control the operation of row controllers 908. Each row controller 908 can communicate with a number of row units 910. Each row unit 910 can comprise a seed tube, a seed detector, and a fluid dispenser, which can operate similar to seed tube ST, seed detector SD, and fluid dispenser FD, respectively, shown in FIG. 5. Each row controller 1108 can control its corresponding row units 910 similar to component 702 shown in FIG. 5. Each row controller 908 can also utilize a shift register for tracking seeds as described with respect to FIG. 4. According to one embodiment, for each row unit 910, there is one input and one output connection with row controller 908 for a seed detector signal and an actuator drive, respectively. Each row controller MCU 908 can communicate status information to master controller 906 for updating user interface UI.

Referring to FIG. 9, master controller 906 can communicate with a radar (or ground speed sensor) 912 for monitoring the ground speed of system 900. In addition, master controller 906 can update the delay value for each row unit 910 as speed changes.

Accurate placement of seed-specific spray bands by fluid dispenser FD can require accurate prediction of seed arrival times. System 200 (FIG. 2) can be calibrated to formulate accurate estimates of seed arrival time, or delay time. According to one embodiment, seed arrival times can be determined by trial-and-error adjustment.

According to another embodiment, calibration can include a function relating seed arrival time to field speed, desired spray band length, valve installation geometry, and other variables influenced by seed type and the seed tube. The seed arrival time can be subdivided into two periods: (1) a time period within seed tube ST which comprises the seed travel time between the sensed location in seed tube ST (FIG. 2) and output end 208 (FIG. 2) of seed tube ST; and (2) a time period outside of seed tube ST which comprises the seed travel time between output end 208 of seed tube ST and the location of fluid application by fluid dispenser FD (FIG. 2).

The time period within seed tube ST (FIG. 2) can be assumed to be constant for a particular seed tube and seed type combination. This time period can be measured on a stationary system while operating the seed meter at a desired rotational speed. To measure this period, a second sensor can be positioned at output 208 (FIG. 2) of seed tube ST and time durations between upper and lower seed sensor pulses can be calculated.

Figure 10:
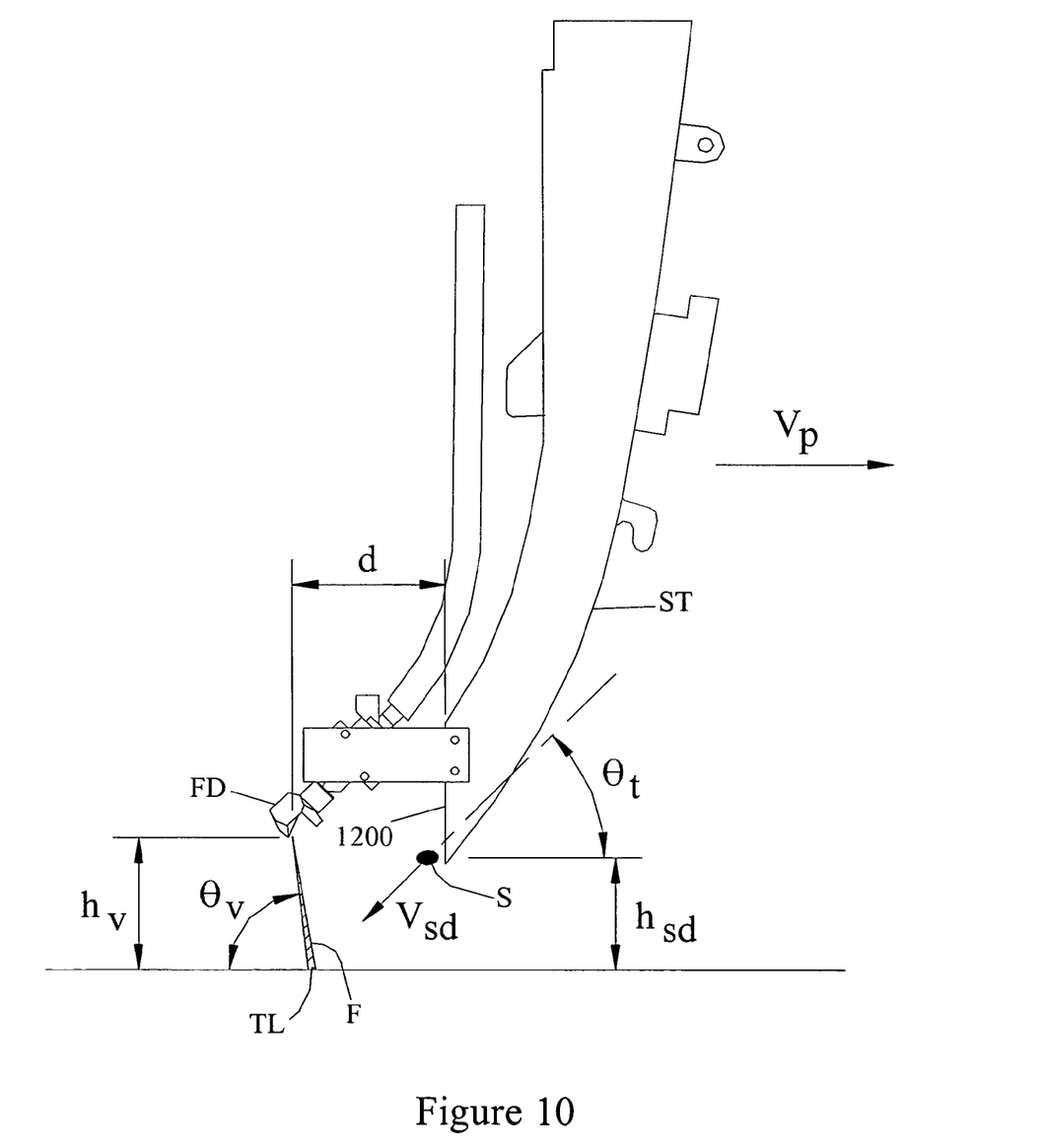
FIG. 10 is a schematic diagram illustrating the geometric relationship among a seed tube, fluid dispensed by a fluid dispenser, and a seed moving from an output of the seed tube to a target location receiving fluid.

The time period outside of seed tube ST can be determined utilizing an expression based on kinematic analysis. FIG. 10 is a schematic diagram illustrating the geometric relationship among a seed tube ST, fluid F dispensed by a fluid dispenser FD, and a seed S moving from an output 1000 of seed tube ST to a target location TL receiving fluid F. For the equations described herein, a position can be referenced to output 1000 of seed tube ST. In addition, for the equations described herein time can be referenced to the time a seed exits output 1000 of seed tube ST. First, seed travel time from output 1000 to target location TL can be expressed with the following equation (where, $t_{fall}$ is the seed fall time from output 1000 of seed tube ST to target location TL, $v_{sd}$ is the magnitude of seed velocity at outlet 1000 in meter per second, $\theta_t$ is the angle between seed velocity vector and horizontal, $a_g$ is the magnitude of acceleration due to gravity in meters per second, and $h_{sd}$ is the height of the seed above the furrow bottom at the output of the seed tube in meters):

$$t_{fall} = \frac{\sqrt{(v_{sd}\sin\theta_t)^2 + 2a_g h_{sd}}}{-a_g}$$

The magnitude of seed velocity ($v_{sd}$) can be estimated by measuring the seed travel time between two optical sensors separated by 3 centimeters at output 1000 of seed tube ST. The direction of seed velocity can be estimated by measuring the angle between horizontal and a line tangent to seed tube ST profile at output 1000 of seed tube ST.

The horizontal component of seed velocity can be used with planter velocity ($v_p$) to calculate lateral displacement between seed landing location and the reference. The following equation can be utilized (where, $x_{SD}$ is the lateral displacement of a seed on furrow impact, measured from output 1000 in meters, $v_p$ is the field speed in meters per second, $v_{sd}$ is the magnitude of seed velocity at outlet 1000 in meter per second, $\theta_t$ is the angle between seed velocity vector and horizontal, and $t_{fall}$ is the seed fall time from output 1000 of seed tube ST to the bottom of the furrow):

$$x_{SD} = (v_p - v_{sd}\cos\theta_t)t_{fall}$$

Lateral displacement between the reference and the point where fluid F from fluid dispenser FD contacts soil can be expressed as a function of time t in the following equation (where, $x_{SP}$ is lateral displacement between output 1000 and target location TL where fluid F contacts soil in meters, $v_p$ is the field speed in meters per second, t is the time to open fluid dispenser FD to release fluid F following seed exit from seed tube ST in seconds, d is the distance between outlet 1000 and the end of fluid dispenser FD in meters, $h_v$ is the height of the end of fluid dispenser FD above target location TL in meters, and $\theta_v$ is the angle between the spray of fluid F and horizontal):

$$x_{SP} = v_p t - d + \frac{h_v}{\tan\theta_v}$$

The desired location to initiate fluid F delivery is a function of where seed S landed and the desired fluid band length as expressed by the following equation (where, $x_{SS}$ is the desired location, measured from the reference, to initiate fluid band delivery in meters, $x_{SD}$ is the lateral displacement of seed S on furrow impact, measured from output 1000 of seed dispenser SD in meters, and b is the desired fluid spray band length in meters):

$$x_{SS} = x_{SD} - \frac{b}{2}$$

Equating valve actuation location ($x_{SS}$) with spray landing location ($x_{SP}$) and then solving for time t results in the following equation as an expression of the time period outside of seed tube ST (where, $period_2$ is the seed travel time between outlet 1200 of seed tube ST and target location TL, and the other terms are described above):

$$period_2 = t_{fall} - \frac{v_{sd}\cos\theta_t t_{fall}}{v_p} + \frac{d}{v_p} - \frac{b}{2v_p} - \frac{h_v}{v_p\tan\theta_v}$$

The above equations include assumptions for simplifying the analysis. These assumptions include fluid dispenser response and instantaneous fluid delivery. An additional term, c, is added to the calibration function to adjust for these assumptions. The value of c is specific to particular fluid dispensers and can be determined empirically by analyzing error between equation-predicted and known delay times for an existing dataset. Delay time between seed detection and fluid dispenser actuation can be expressed with the following equation (where Delay=the time between seed detection and fluid dispenser actuation, c is the empirical adjustment to correct for assumptions, and the other terms are defined above):

$$\text{Delay} = period_1 + period_2 + c$$

According to one embodiment, the magnitude of the empirical adjustment factor, c, is −2.5 milliseconds, and the overall predicted delay times ranged from 103 to 123 milliseconds.

It will be understood that various details of the subject matter described herein may be changed without departing from the scope of the subject matter. Furthermore, the foregoing description is for the purpose of illustration only, and not for the purpose of limitation.

What is claimed is:

1. A method for dispensing fluid, the method comprising:
   (a) providing a seed tube and a sensor; and
   (b) detecting a seed passing a first location inside the seed tube with the sensor as the seed moves to a second location; and
   (c) providing a fluid dispenser operable to dispense fluid at the second location; and
   (d) receiving information from the sensor that the seed has passed the first location; and
   (e) in response to step (d), controlling the fluid dispenser to dispense fluid at the second location at a predetermined time after the seed passes the first location.

2. The method of claim 1 wherein the sensor optically detects the seed.

3. The method of claim 1 comprising calculating the predetermined time based on a predicted time for arrival by the seed at the second location.

4. The method of claim 3 wherein calculating the predicted time comprises calculating an average seed travel time from the first location to the second location.

5. The method of claim 1, wherein the seed tube comprises a dispensing end, and comprising dispensing the seed from the seed tube at the dispensing end after which the seed drops to the second location outside of the seed tube.

6. The method of claim 5 wherein the seed drops from the dispensing end of the seed tube into a furrow.

7. The method of claim 6 comprising dispensing a predetermined amount of fluid at the second location with the fluid dispenser upon or after the seed drops into the furrow.

8. The method of claim 1 comprising detecting with the sensor when a plurality of seeds sequentially pass the first location, and comprising causing the fluid dispenser to dispense fluid non-continuously at a predetermined time at the second location for each seed.

9. The method of claim 1 comprising providing a control unit comprising a shift register and a clock, wherein the shift register includes n bits that shift according to a clock cycle of the clock to indicate when the predetermined time has elapsed, and wherein the predetermined time is equivalent to the clock cycle multiplied by n.

10. The method of claim 9 wherein the shift register comprises an input and an output bit, wherein the input bit shifts towards the output bit, and wherein the input bit is set to a predetermined bit when the sensor detects that the first seed passes the first location, and wherein the predetermined time has elapsed when the predetermined bit shifts to the output bit.

11. The method of claim 9 wherein the control unit indicates that the predetermined time has elapsed upon or after the first seed has reached the second location.

12. The method of claim 1 comprising providing a programmable controller for determining the predetermined time.

13. The method of claim 1 comprising activating a user interface to control the predetermined time.

* * * * *